(12) United States Patent
Whitehurst

(10) Patent No.: US 10,294,797 B2
(45) Date of Patent: May 21, 2019

(54) FAN BLADE ASSEMBLY

(71) Applicant: United Technologies Corporation, Hartford, CT (US)

(72) Inventor: Sean A. Whitehurst, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 393 days.

(21) Appl. No.: 15/023,291

(22) PCT Filed: Sep. 12, 2014

(86) PCT No.: PCT/US2014/055447
§ 371 (c)(1),
(2) Date: Mar. 18, 2016

(87) PCT Pub. No.: WO2015/047752
PCT Pub. Date: Apr. 2, 2015

(65) Prior Publication Data
US 2016/0201471 A1 Jul. 14, 2016

Related U.S. Application Data

(60) Provisional application No. 61/883,733, filed on Sep. 27, 2013.

(51) Int. Cl.
*F01D 5/28* (2006.01)
*F01D 5/14* (2006.01)
(Continued)

(52) U.S. Cl.
CPC ............... *F01D 5/147* (2013.01); *F01D 5/28* (2013.01); *F01D 5/284* (2013.01); *F01D 5/288* (2013.01); *F04D 29/023* (2013.01); *F04D 29/324* (2013.01); *F04D 29/388* (2013.01); *F05D 2220/32* (2013.01); *F05D 2230/54* (2013.01); *F05D 2230/90* (2013.01); *F05D 2240/303* (2013.01); *F05D 2260/95* (2013.01); *F05D 2300/133* (2013.01); *F05D 2300/173* (2013.01);
(Continued)

(58) Field of Classification Search
None
See application file for complete search history.

(56) References Cited

U.S. PATENT DOCUMENTS 3,892,612 A 7/1975 Carlson
5,908,285 A * 6/1999 Graff ........................ C25D 1/10
 205/67

(Continued)

OTHER PUBLICATIONS

European Search Report for Application No. EP 14 84 8825.
(Continued)

*Primary Examiner* — Jason D Shanske
*Assistant Examiner* — Theodore C Ribadeneyra
(74) *Attorney, Agent, or Firm* — Cantor Colburn LLP

(57) ABSTRACT

The present disclosure relates generally to a fan blade assembly. In an embodiment, the fan blade assembly includes an airfoil having a forward edge covered by a sheath. The airfoil and the sheath are made from dissimilar conductive materials. A nonconductive coating is applied the an airfoil contact surface of the sheath before it is bonded to the leading edge of the airfoil.

17 Claims, 3 Drawing Sheets

(51) Int. Cl.
*F04D 29/38* (2006.01)
*F04D 29/02* (2006.01)
*F04D 29/32* (2006.01)

(52) U.S. Cl.
CPC .... *F05D 2300/174* (2013.01); *F05D 2300/20* (2013.01); *Y02T 50/672* (2013.01)

(56) References Cited

U.S. PATENT DOCUMENTS

| | | | |
|---|---|---|---|
| 2006/0275626 A1 | 12/2006 | Bernard | |
| 2010/0008788 A1* | 1/2010 | Barbee | F01D 5/288 416/224 |
| 2010/0074726 A1* | 3/2010 | Merrill | F01D 5/288 415/115 |
| 2011/0116906 A1 | 5/2011 | Smith | |
| 2011/0164986 A1* | 7/2011 | Roberts | F01D 5/147 416/230 |
| 2011/0194941 A1 | 8/2011 | Parkin | |
| 2011/0211967 A1 | 9/2011 | Deal | |
| 2012/0082553 A1* | 4/2012 | Eleftheriou | F01D 5/147 416/224 |
| 2012/0152893 A1* | 6/2012 | Parkos | F01D 5/005 216/34 |
| 2013/0239586 A1 | 9/2013 | Parkin et al. | |

OTHER PUBLICATIONS

International Search Report Application No. PCT/US2014/055447; dated Dec. 22, 2014.
Written Opinion for Application No. PCT/US2014/055447; dated Dec. 22, 2014.

\* cited by examiner

FAN BLADE ASSEMBLY

CROSS-REFERENCE TO RELATED APPLICATIONS

The present application claims the benefit of and incorporates by reference herein the disclosure of U.S. Ser. No. 61/883,733 filed Sep. 27, 2013.

TECHNICAL FIELD OF THE DISCLOSURE

The present disclosure is generally related to rotating assemblies for turbomachinery and, more specifically, to a fan blade assembly.

BACKGROUND OF THE DISCLOSURE

In a turbofan engine, lighter components generally lead to more efficient performance. If less energy is expended to move internal engine parts, more energy is available for useful work. At the same time, the components themselves must be strong enough to withstand operational forces, and types of failure typical for the operating environment of the engine. Safety considerations and regulations based on the frequency and/or severity of possible failure will often dictate that the engine components also be able to withstand other atypical, yet foreseeable events. Because stronger and lighter components are often more expensive, a balance must be struck between efficiency, safety, and cost.

Few locations in an aircraft are more representative of efforts to optimize the balance between efficiency, safety, and cost than the engine. While lighter materials are preferable to improve efficiency, the high risk of severe consequences from engine damage will require that the engine be made of components having additional margins of safety. Combining parts having both high strength and low density greatly restricts material choices and increases costs. Not infrequently, processing these strong and light materials such as titanium or composites is also complex and expensive.

Being designed to pull vast quantities of air through the bypass section to generate thrust, blades in the fan section of the engine are the first line of defense for the engine and are highly susceptible to both small and large scale damage from objects pulled in with the surrounding air, including bird impact damage.

Small scale blade damage causes performance deterioration and increases the number of potential crack initiation sites, while large scale damage includes blade deformation and failure. Small impacts can also lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Blades made entirely from high-strength materials, such as titanium or titanium alloys to name just two non-limiting examples, have been proven to offer sufficient hardness to resist erosion and foreign object damage. But titanium alloys are often expensive to purchase and manipulate into a finished blade. And while titanium has a relatively low density compared to a number of metals, the weight of titanium fan blades are significant contributors to overall engine weight. Fiber composites offer significant weight savings relative to titanium and its alloys, but are far more expensive and do not offer the same resiliency.

One technique of reducing the weight of a blade is to use a lower-density metallic material for the airfoil body. As described earlier, composite blades are extremely light, but are far more complex and expensive to produce relative to titanium blades. Small composite blades do not generally achieve sufficient weight savings to merit the additional complexity and cost.

Forming the blade from a lightweight metallic material can reduce cost and weight over a titanium blade. But without additional support or reinforcement, airfoils made solely from most lightweight metals or alloys do not offer sufficient strength and longevity for long-term use.

Multi-material assembled fan blades, consisting of, but not limited to, a sheath and a blade body made of dissimilar conductive materials, such as metals and/or composites, create a galvanic potential. Currently, a non-conductive adhesive is used to bond the sheath to the blade. The non-conductive adhesive therefore provides an insulative layer that prevents the flow of electrons in the potential galvanic current. This adhesive can have gaps in coverage allowing electrons to flow between the two dissimilar materials, which can potentially lead to corrosion.

Various designs for providing a sheath for use on a fan blade have been proposed, but improvements are still needed in the art.

SUMMARY OF THE DISCLOSURE

In one embodiment, a fan blade assembly is disclosed, comprising: a conductive airfoil including a forward airfoil edge; a conductive sheath including an airfoil contact surface, the airfoil contact surface coated with a nonconductive material; and an adhesive disposed on at least a portion of the nonconductive material to bond the conductive sheath to the conductive airfoil at the airfoil contact surface.

In another embodiment, a gas turbine engine is disclosed, comprising in serial flow communication: a fan section including a fan blade assembly, the fan blade assembly comprising: a conductive airfoil including a forward airfoil edge; a conductive sheath including an airfoil contact surface, the airfoil contact surface coated with a nonconductive material; and an adhesive disposed on at least a portion of the nonconductive material to bond the conductive sheath to the conductive airfoil at the airfoil contact surface; a compressor section; a combustor section; and a turbine section.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
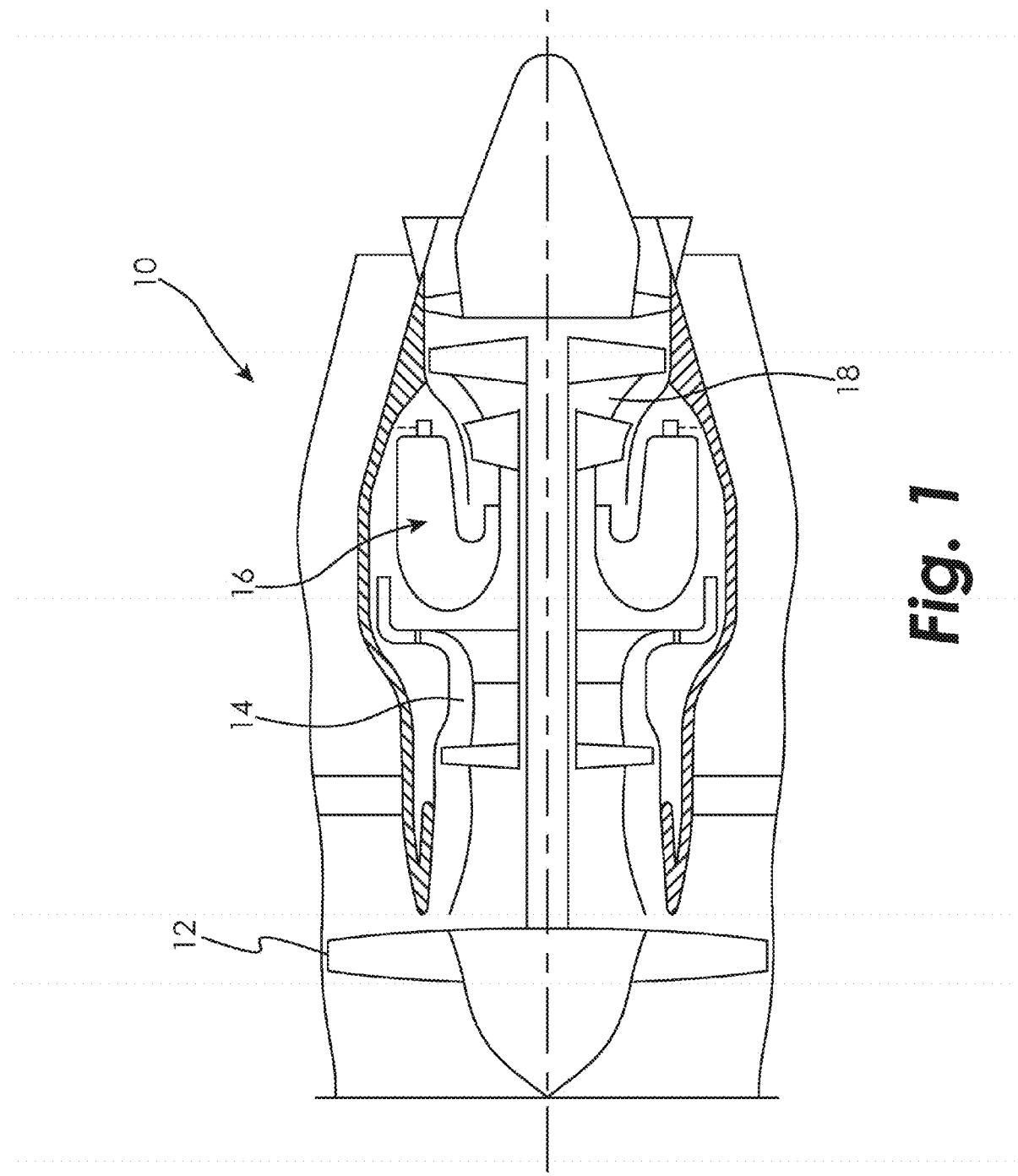
FIG. 1 is a schematic cross-sectional view of a gas turbine engine.

FIG. 1 illustrates a gas turbine engine 10 of a type normally provided for use in a subsonic flight, generally comprising in serial flow communication a fan section 12 through which ambient air is propelled, a compressor section 14 for pressurizing a portion of the air (the gas path air), a combustor 16 in which the compressed air is mixed with fuel and ignited for generating a stream of hot combustion gases, and a turbine section 18 for extracting energy from the combustion gases. Although a gas turbine engine is discussed herein as an illustrative example, the presently disclosed embodiments are applicable to sheathed blades in other applications, such as sheaths for helicopter rotors, to name just one non-limiting example.

Figure 2:
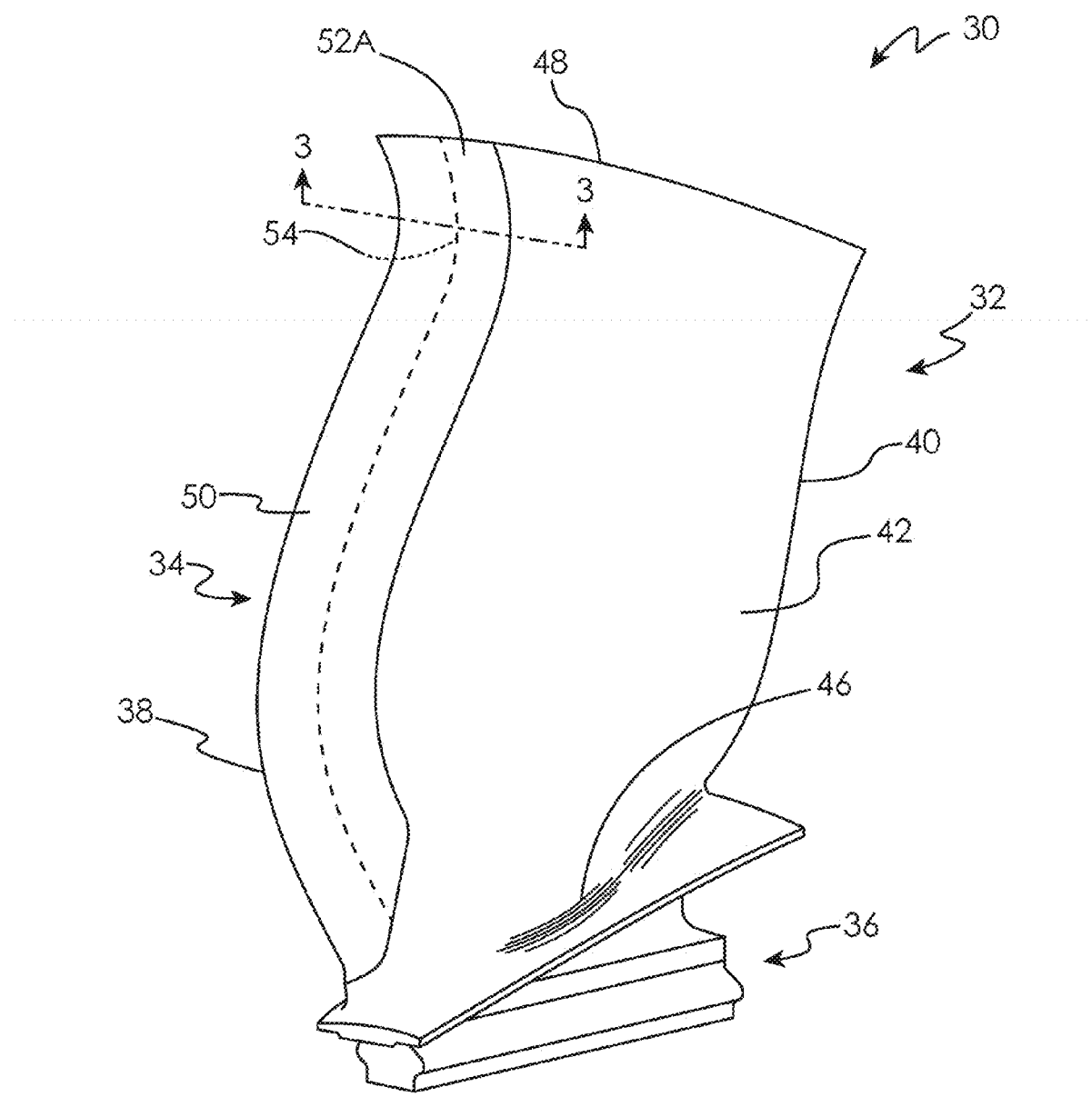
FIG. 2 is a schematic perspective view of a fan blade assembly in an embodiment.

A side view of exemplary fan blade assembly 30 is shown in FIG. 2, which includes cross section 3-3. As seen in FIG. 2, three parts are joined to form fan blade assembly 30: airfoil 32, sheath 34, and root 36. Blade 30 has leading edge 38, trailing edge 40, and suction surface 42. Fan blade assembly 30 also includes platform 46, tip edge 48, sheath head section 50, sheath flank 52A, and forward airfoil edge 54. Pressure surface 44 and sheath flank 52B are at the rear of blade 30 (not visible; shown in FIGS. 3A and 3B). It will be appreciated that platform 46 may be formed integrally or non-integrally to the remainder of the airfoil 32.

Leading edge 38 and trailing edge 40 extend generally spanwise in a curved manner from platform 46 to tip edge 48. Air flows chordwise from leading edge 38 over suction surface 42 and pressure surface 44, meeting at trailing edge 40. Root 36 links fan blade assembly 30 at platform 46 to a disk or rotor (not shown) in fan section 12. Here root 36 is shown as a "dovetail" root; however, such an arrangement is not required in the present embodiments. Alternatively, fan blade assembly 30 can have a different configuration of root 36, or root 36 can be incorporated with the disk in what is known in the art as an integral rotor blade configuration.

Sheath 34 covers a portion of airfoil 32 proximal forward airfoil edge 54, extending spanwise over at least a part of the length of leading edge 38 between platform 46 and tip edge 48. Forward airfoil edge 54 is represented by a broken line extending spanwise along sheath 34. It has been found that adding protective sheath 34 over forward airfoil edge 54 of lightweight airfoil 32 can prevent a significant amount of such damage and slow degradation of fan blade assembly 30.

Figure 3A:
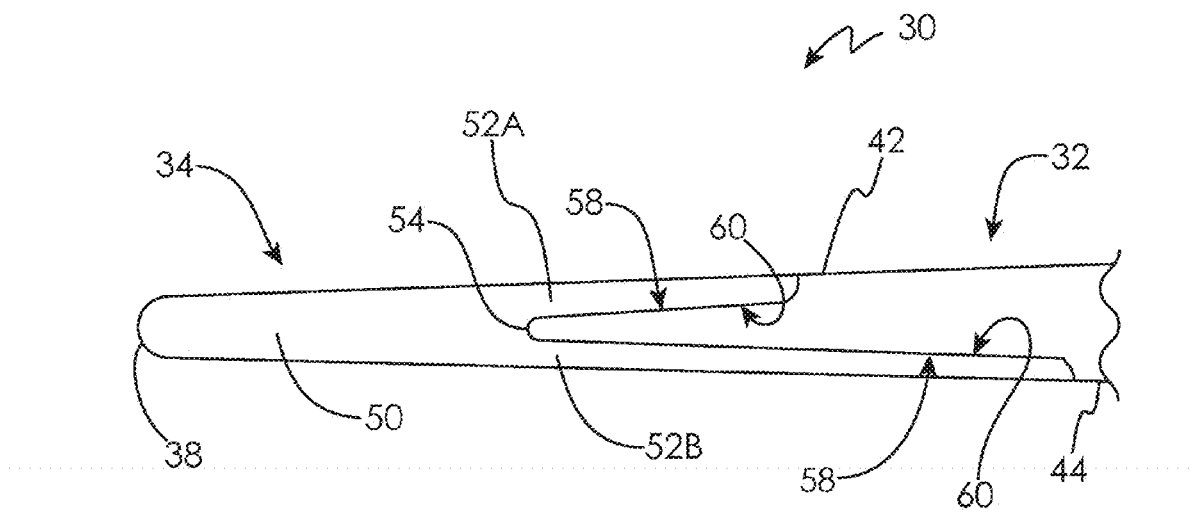
FIG. 3A is a schematic cross-sectional view of the fan blade assembly of FIG. 2 in an embodiment.

FIG. 3A depicts a partial cross-section of fan blade assembly 30 in an embodiment, taken across line 3-3 of FIG. 2. Fan blade assembly 30 includes airfoil 32, sheath 34, leading edge 38, suction surface 42, pressure surface 44, sheath head section 50, sheath flanks 52A and 52B, airfoil forward edge 54, and sheath receiving surface 58 on the airfoil 32 and a corresponding airfoil contact surface 60 on the sheath 34.

Sheath receiving surface 58 is located on airfoil 32 proximate leading edge 38 and includes a portion of suction surface 42 and pressure surface 44. Flanks 52A and 52B extend back from head section 50 over portions of suction surface 42 and pressure surface 44 proximate leading edge 38. A nonconductive adhesive covers the sheath receiving surface 58/airfoil contact surface 60 to bond the sheath 34 to the airfoil 32.

Figure 3B:
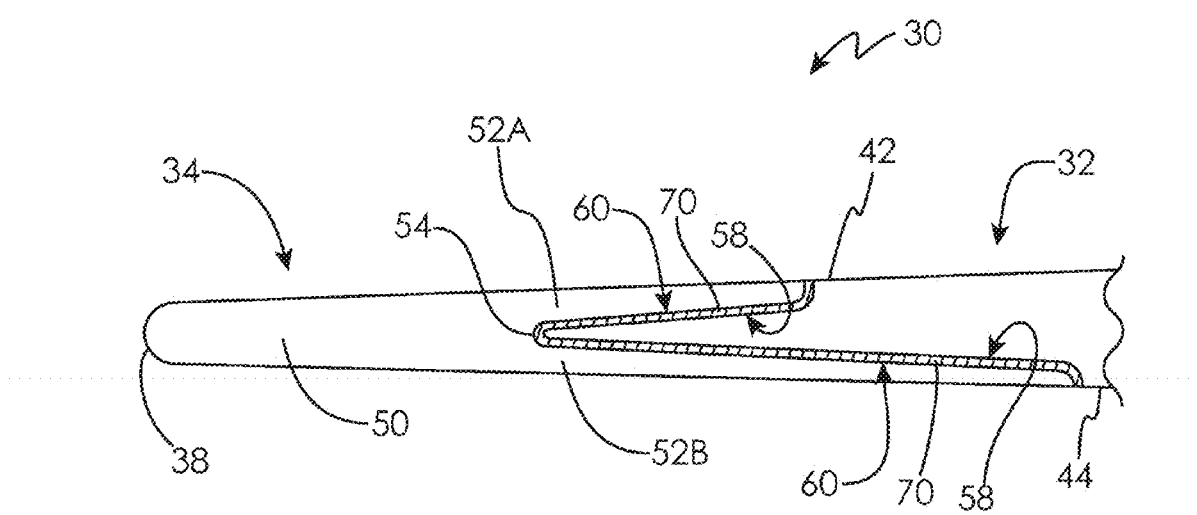
FIG. 3B is a schematic cross-sectional view of the fan blade assembly of FIG. 2 in an embodiment.

FIG. 3B depicts a partial cross-section of fan blade assembly 30 taken across line 3-3 of FIG. 2. It is at the sheath receiving surface 58/airfoil contact surface 60 that the possibility of a galvanic potential arises. If there is a gap in coverage of the nonconductive adhesive that covers the sheath receiving surface 58/airfoil contact surface 60, then a galvanic potential will be created between the dissimilar materials of the airfoil 32 and sheath 34. Therefore, as shown in FIG. 3B, at least the airfoil contact area 60 of sheath 34 is coated in an embodiment with a nonconductive material 70, such as a ceramic or other isolating material, prior to bonding the sheath 34 to the airfoil 32. Adhesive may still be used to bond the sheath 34 to the airfoil 32 during the fan blade assembly 30 assembly process, but the adhesive would not need to be relied on as the sole insulator between the dissimilar conductive materials of the sheath 34 and the airfoil 32. In some embodiments, a conductive adhesive could be used to bond the sheath 34 to the airfoil 32 because the nonconductive coating would ensure that no electrical current is passed between the dissimilar materials.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A fan blade assembly, comprising:
a conductive airfoil including a forward airfoil edge;
a conductive sheath including an airfoil contact surface, the airfoil contact surface coated with a nonconductive material, wherein the nonconductive material comprises a ceramic; and
an adhesive disposed on at least a portion of the nonconductive material to bond the conductive sheath to the conductive airfoil at the airfoil contact surface, wherein the nonconductive material is applied to the airfoil contact surface prior to the bonding of the sheath to the airfoil; and wherein
the conductive airfoil comprises a first metal;
the conductive sheath comprises a second metal; and
the first metal is different than the second metal.

2. The fan blade assembly of claim 1, wherein the adhesive comprises a nonconductive adhesive.

3. The fan blade assembly of claim 1, wherein the adhesive comprises a conductive adhesive.

4. The fan blade assembly of claim 1, wherein the conductive airfoil is formed from an aluminum alloy.

5. The fan blade assembly of claim 1, wherein the conductive sheath is formed from a material that is titanium or titanium alloy.

6. The fan blade assembly of claim 1, wherein: the conductive airfoil further includes an airfoil forward edge, a pressure side and a suction side; the conductive sheath further includes a sheath head section and first and second flanks extending from the sheath head section; and wherein the conductive sheath covers at least a portion of the airfoil forward edge, the first flank covers at least a portion of the suction side, and the second flank covers at least a portion of the pressure side.

7. A fan blade assembly, comprising:
a conductive airfoil including a forward airfoil edge;

a conductive sheath including an airfoil contact surface, the airfoil contact surface coated with a nonconductive material; and an adhesive disposed on at least a portion of the nonconductive material to bond the conductive sheath to the conductive airfoil at the airfoil contact surface, wherein the nonconductive material comprises a ceramic.

8. The fan blade assembly of claim 1, wherein the conductive sheath covers substantially the entire forward airfoil edge.

9. The fan blade assembly of claim 1, wherein the first metal comprises an aluminum alloy.

10. The fan blade assembly of claim 1, wherein the second metal is titanium or titanium alloy.

11. A gas turbine engine, comprising in serial flow communication:

a fan section including a fan blade assembly, the fan blade assembly comprising:

a conductive airfoil including a forward airfoil edge;

a conductive sheath including an airfoil contact surface, the airfoil contact surface coated with a nonconductive material, wherein the nonconductive material comprises a ceramic; and an adhesive disposed on at least a portion of the nonconductive material to bond the conductive sheath to the conductive airfoil at the airfoil contact surface, wherein the nonconductive material is applied to the airfoil contact surface prior to the bonding of the sheath to the airfoil; and wherein the conductive airfoil comprises a first metal;

the conductive sheath comprises a second metal; and the first metal is different than the second metal;

a compressor section;

a combustor section; and a turbine section.

12. The gas turbine engine of claim 11, wherein the conductive airfoil is formed from an aluminum alloy.

13. The gas turbine engine of claim 11, wherein the conductive sheath is formed from titanium or titanium alloy.

14. The gas turbine engine of claim 11, wherein: the conductive airfoil further includes an airfoil forward edge, a pressure side and a suction side; the conductive sheath further includes a sheath head section and first and second flanks extending from the sheath head section; and wherein the conductive sheath covers at least a portion of the airfoil forward edge, the first flank covers at least a portion of the suction side, and the second flank covers at least a portion of the pressure side.

15. The gas turbine engine of claim 11, wherein the conductive sheath covers substantially the entire forward airfoil edge.

16. The gas turbine engine of claim 11, wherein the first metal comprises an aluminum alloy.

17. The gas turbine engine of claim 11, wherein the second metal is titanium or titanium alloy.

* * * * *